US012376203B2

(12) United States Patent
Falzetti et al.

(10) Patent No.: US 12,376,203 B2
(45) Date of Patent: Jul. 29, 2025

(54) GLASS CONTAINER PRODUCTION (71) Applicant: STEVANATO GROUP S.P.A., Piombino Dese (IT)

(72) Inventors: Angelo Falzetti, Saonara (IT); Paolo Ziero, Piombino Dese (IT)

(73) Assignee: STEVANATO GROUP S.P.A.

(*) Notice: Subject to any disclaimer, the term of this patent is extended or adjusted under 35 U.S.C. 154(b) by 0 days.

(21) Appl. No.: 18/781,499

(22) Filed: Jul. 23, 2024

(65) Prior Publication Data
US 2025/0040002 A1 Jan. 30, 2025

(30) Foreign Application Priority Data
Jul. 24, 2023 (IT) .................. 102023000015462

(51) Int. Cl.
H05B 6/66 (2006.01)
H05B 6/72 (2006.01)
H05B 6/80 (2006.01)

(52) U.S. Cl.
CPC ............. H05B 6/664 (2013.01); H05B 6/72 (2013.01); H05B 6/80 (2013.01)

(58) Field of Classification Search
CPC ....... C03B 23/043; C03B 29/02; C03B 29/04; H05B 6/664; H05B 6/72; H05B 6/80
USPC ....... 219/718, 702, 715, 719, 745, 749, 750, 219/762
See application file for complete search history.

(56) References Cited

U.S. PATENT DOCUMENTS

| 5,378,878 A * | 1/1995 | Revesz ............... F27D 5/0068 219/679 |
| 7,000,430 B1 | 2/2006 | Fotheringham et al. |
| 10,968,133 B2 * | 4/2021 | Gaylo ................... C03B 23/09 |
| 2021/0017070 A1 * | 1/2021 | Suzuki ................. A61J 1/1468 |

FOREIGN PATENT DOCUMENTS

| DE | 37 04 054 A1 | 8/1988 |
| EP | 3875208 A1 | 9/2021 |
| IT | 2019 0000 5600 A1 | 11/2020 |
| WO | 2024105141 A1 | 5/2024 |
| WO | 2024118359 A1 | 6/2024 |

OTHER PUBLICATIONS

Italian Search Report Jul. 24, 2023 for Italian Application No. 202300015462.

* cited by examiner

*Primary Examiner* — Quang T Van
(74) *Attorney, Agent, or Firm* — Husch Blackwell LLP (57) ABSTRACT A glass container production line and process include a first step of heating a portion of the glass container by delivering microwaves and conveying them to the portion of the glass container. Microwave delivery is carried out at a first power level for a first time interval so as to bring the portion of the glass container from an ambient temperature to an intermediate temperature, and at a further power level, which is lower than the first power level, for a further time interval following the first time interval, so as to bring the portion of the glass container from the intermediate temperature to a first predetermined working temperature.

17 Claims, 4 Drawing Sheets

GLASS CONTAINER PRODUCTION

CROSS REFERENCES

This application claims priority to Italian Application No. 102023000015462, filed Jul. 24, 2023, the entire disclosure of which is hereby incorporated by reference.

TECHNICAL FIELD

The present disclosure concerns a glass container production line and process and, more particularly, to production of glass containers from a raw material formed by pieces of glass tube.

BACKGROUND

Glass containers can be, for example, bottles, syringes, or cartridges. The production of glass containers may comprise various steps such as, for example, a step of piercing an end of the glass tube, a step of forming a shoulder of the container, a step of forming the mouth of the container, a cutting step and/or a step of forming the bottom of the container. These steps can be carried out with the aid of a heat source adapted to bring the glass to a desired working temperature for each processing step.

The Applicant has observed that in the field of production of glass containers for pharmaceutical use, the glass is typically heated by open flame composed of a mixture of methane and oxygen in different percentages depending on the step. The Applicant has however observed that the use of an open flame is generally disadvantageous as it has an environmental impact of a certain importance; it has a modest energy efficiency with a high heat dispersion; it does not allow to control the process precisely and punctually both because it must be adjusted based on the experience of the worker and because it is easily influenced by environmental aspects such as temperature, humidity etc.; the pipes for the transport of the mixture have pressure drops that do not allow a precise and punctual control over the quantities of methane and oxygen and their burning rate; the temperatures of the flame are very high (more than 3000 K) so they damage the quality of the glass and cause a violent production of alkaline releases.

The Applicant has felt the need to use a heat source alternative to the open flame in the various glass processing steps.

U.S. Pat. No. 7,000,430 describes a method for the production of glass parts by deformation of raw glass using a short-wave infrared radiation source. The Applicant has observed that this document describes a type of diffused and distributed heating on a glass surface with heating times for obtaining temperatures of interest (i.e. above 1000° C.) of at least about 50-80 seconds. This solution is therefore not suitable either for use in a high-speed production process (with production times of a few seconds) or for processing steps that require localized and precise heating.

EP3875208 describes a method for processing glass, in particular, for carrying out cutting operations, which involves the use of a laser source, adapted to carry out localized heating, together with a microwave source which, used in combination with the laser, allows to accelerate the heating process while avoiding an uncontrolled process due to the formation of local overheating zones caused by excessive microwave coupling. In particular, the laser source creates localized heating zones that bring the glass to the melting temperature where the dielectric loss factor is suddenly increased and direct heating by the microwaves takes place. The Applicant has observed that the solution described by this document—requiring two types of heating sources—is in general complex, expensive and cumbersome.

In this context, the Applicant has felt the need to provide an alternative solution for heating the glass in a glass container production process. In particular, the Applicant has felt the need to provide an alternative solution that is improved in terms of production times and costs that allows, at the same time, to carry out the heating in an efficient, precise, and punctual manner.

SUMMARY

The Applicant has found that these needs can be met by using, as the only type of heating source, a microwave heating source and by adopting an appropriate adjustment of the power delivered by said source.

In a first aspect thereof, the present disclosure therefore concerns a glass container production line comprising:
  N workstations configured to perform respective production steps on glass containers being processed along the line, wherein N is an integer at least equal to 1;
  M heating devices associated with at least a part of the N workstations to heat portions of the glass containers being processed, wherein M is an integer at least equal to 1;
  wherein the M heating devices respectively comprise M microwave sources and M adjustment units operatively associated with the M microwave sources, each of the M adjustment units being configured to adjust in power the respective microwave source;
  wherein one or more workstations of the N workstations is intended to perform a first heating step to bring a portion of each glass container being processed from an ambient temperature to a predetermined first working temperature, the adjustment units of the heating devices of said one or more workstations being configured to adjust the respective microwave sources so as to deliver microwaves while performing the first heating step:
  at a first power level P1 for a first time interval T1 so as to bring said portion of said glass container from the ambient temperature to an intermediate temperature, and
  at a further power level P3, which is lower than the first power level P1, for a further time interval T3 following the first time interval T1, so as to bring said portion of said glass container from said intermediate temperature to the first predetermined working temperature.

In a second aspect thereof, the present disclosure concerns a glass container production process comprising a plurality of production steps, said plurality of production steps comprising a first heating step of a portion of said glass container by delivering microwaves and conveying them to the portion of said glass container, wherein the microwave delivery is carried out:
  at a first power level P1 for a first time interval T1 so as to bring said portion of said glass container from an ambient temperature to an intermediate temperature, and
  at a further power level P3, which is lower than the first power level P1, for a further time interval T3 following the first time interval T1, so as to bring said portion of said glass container from said intermediate temperature to a first predetermined working temperature.

Considering that, when heating with a microwave source the glass in the solid state, it maintains for a certain temperature interval a very low microwave absorption efficiency which then increases sharply above a certain critical temperature, the solution of the present disclosure, by using microwave sources adjustable in power, advantageously allows to modulate the power supplied, delivering high power for a first time interval, where the absorption efficiency by the glass is very low, so as to intensively heat the solid glass and quickly bring it in a more fluid phase (softening) where the absorption efficiency increases quickly, and then—at that point—proceed for a further time interval with a lower power delivery that allows to control with precision the softening phenomenon of the glass above the aforementioned critical temperature.

The Applicant has verified that this advantageously allows to overcome the problems described by EP3875208 (relating to the risk of uncontrolled microwave coupling on the glass with the formation of unwanted overheating) and to carry out both cutting and glass forming operations in a controlled manner with times compatible with a high-speed industrial production process. Moreover, the use of a microwave heating source, as the only type of heating source, advantageously allows to limit costs compared to other solutions typically using more expensive heating sources (such as, for example, a laser) and/or more heating sources combined with each other.

Overall, the objectives set forth above of providing an alternative solution that allows to heat the glass in a glass container production process in an optimized way in terms of heating efficiency, production times and costs and the possibility of controlling the heating process in a precise and punctual manner are thus achieved.

In the course of the present description and claims, with "glass container being processed" is meant a semi-finished glass container at any step of the relative production process, including the starting raw material consisting of a piece of glass tube.

In the course of the present description and claims, the expression "glass container" can be used to indicate a finished glass container, obtained at the end of the production process, or a glass container being processed.

In the course of the present description and claims, by "production cycle time" referred to a workstation, it is intended to indicate the time that elapses between the exit of a glass container being processed and the exit of the next glass container being processed.

In the course of the present description and claims, the temperature values are to be considered with a tolerance interval. For example, this interval may be ±20% of the indicated value or ±15% of the indicated value or ±10% of the indicated value.

In the course of the present description and claims, the power values are to be considered with a tolerance interval. For example, this interval may be ±20% of the indicated value or ±15% of the indicated value or ±10% of the indicated value.

Preferably, in the case of a single workstation intended to perform the first heating step, the adjustment unit of the heating device of said single workstation is configured to adjust the respective microwave source so as to switch from the first power level P1 to the further power level P3 with a switching time lower than 100 ms, preferably within a range of 10 to 20 ms.

In one embodiment, the adjustment units of the heating devices of said one or more workstations intended to perform the first heating step are configured to adjust the respective microwave sources while performing the first heating step at a second power level P2 for a second time interval T2; wherein the second power level P2 is comprised between the first power level P1 and the further power level P3 and the second time interval T2 is temporally comprised between the first time interval T1 and the further time interval T3.

Preferably, in the case of a single workstation intended to perform the first heating step, the adjustment unit of the heating device of said single workstation is configured to adjust the respective microwave source so as to switch from the first power level P1 to the second power level P2 and from the second power level P2 to the further power level P3 with a switching time lower than 100 ms, preferably within a range of 10 to 20 ms.

Preferably, each of the M adjustment units is configured to adjust the power of the respective microwave source with an adjustment time of less than 100 ms, preferably within a range of 10 to 20 ms.

Preferably, each of the M adjustment units is configured to adjust the respective microwave source so as to switch it off at the exit of one of the glass containers being processed from the respective workstation and switch it on again at the entrance of the next glass container being processed.

Preferably, each of the M adjustment units is configured to switch the respective microwave source off and on with a switch-on/switch-off time of less than 100 ms, preferably within a range of 10 to 20 ms.

In a preferred embodiment, one or more workstations of the N workstations is intended to perform another step of heating the portion of each glass container being processed, the adjustment units of the heating devices of said one or more workstations being configured to adjust the respective microwave sources so as to deliver microwaves while performing said another heating step at least at a determined power level Px for a determined time interval Tx so as to bring said portion of said glass container being processed from a current temperature greater than ambient temperature, to a second predetermined working temperature.

The second predetermined working temperature may be the same as or different from the first predetermined working temperature.

The first predetermined working temperature may, for example, be comprised between 800° C. and 1400° C.

The second predetermined working temperature may, for example, be comprised between 800° C. and 1400° C.

Preferably, said current temperature is comprised between a glass transition temperature of the glass and said second predetermined working temperature.

Preferably, said current temperature is comprised between a softening temperature of the glass and said second predetermined working temperature.

Preferably, the N workstations are configured to perform the respective production steps with a production cycle time Tc comprised between 0.8 and 2.8 seconds, preferably between 1 and 1.4 seconds.

Preferably, the time that elapses between the exit of one of the glass containers being processed and the entrance of the next one in each of the N workstations is comprised between 0.4 and 1 second, preferably between 0.4 and 0.6 seconds.

Preferably, the M heating devices comprise the M microwave sources as the only type of heating source.

Preferably, the first power level P1 is at least 1.5 times the further power level P3; more preferably it is at least 1.8 times the further power level P3; even more preferably it is at least 2 times the further power level P3; even more preferably it is at least 2.5 times the further power level P3.

Preferably, the first power level P1 is greater than zero.

Preferably, the further power level P3 is greater than zero.

In one embodiment, the first power level P1 is comprised between 700 and 750 W.

In one embodiment, the further power level P3 is comprised between 250 and 400 W.

Preferably, said intermediate temperature to which the glass is brought at the end of the first time interval T1 is comprised between a glass transition temperature and a softening temperature of the glass of the glass containers being processed.

In one embodiment, said intermediate temperature to which the glass is brought at the end of the first time interval T1 is comprised between 40° and 800° C.

In one embodiment, said first predetermined working temperature to which the glass is brought at the end of the further time interval T3 is comprised between 80° and 1400° C.

In one embodiment, the first power level P1 is comprised between 700 and 750 W; the second power level P2 is comprised between 300 and 400 W and the further power level P3 is comprised between 250 and 300 W.

Preferably, the second time interval T2 corresponds to the time required, by delivering microwaves at the second power level P2, to bring the glass from said intermediate temperature reached at the end of the first time interval T1 to a second temperature comprised between said intermediate temperature and said first predetermined working temperature.

Preferably, the further time interval T3 corresponds to the time required to bring the glass from the second temperature reached at the end of the second time T2 to the first predetermined working temperature.

In one embodiment, said intermediate temperature to which the glass is brought at the end of the first time interval T1 is comprised between 40° and 600° C.; said second temperature to which the glass is brought at the end of the second time interval T2 is comprised between 60° and 800° C. and said first predetermined working temperature to which the glass is brought at the end of the further time interval T3 is comprised between 80° and 1400° C.

In one embodiment, the M microwave sources are configured to emit microwaves within the range of 2 to 5 GHZ, preferably at 2.45 GHz.

Preferably, the M microwave sources are configured to emit pulses with variable duty cycle.

Preferably, each of the M adjustment units is configured to adjust the power of the respective microwave source by adjusting the duty cycle of the pulses.

In one embodiment, the M microwave sources are microwave generators of the solid-state type.

In one embodiment, the glass containers have a longitudinal axis.

In one embodiment, the glass containers have a tubular body and the longitudinal axis is an axis of symmetry of the tubular body.

In one embodiment, the tubular body has a diameter comprised between 5 and 50 mm.

Preferably, in the M heating devices each of the M microwave sources is associated with a waveguide configured to convey the delivered microwaves towards the portion to be heated of the glass container being processed.

Preferably, said waveguide has an opening defining a processing area of the glass container being processed.

This advantageously allows to define a processing mask of the glass container being processed that allows to isolate the portion of the container in which the coupling between the delivered microwaves and the glass is optimal to guarantee a uniform processing and therefore an energy-efficient process.

Preferably said opening has a dimension perpendicular to the longitudinal axis of the glass container being processed that is lower than or equal to the diameter of the tubular body of the glass container being processed; preferably the ratio between said dimension of the waveguide opening and the diameter of the glass container being processed is comprised between 0.3 and 1; more preferably between 0.4 and 0.8; even more preferably between 0.5 and 0.7.

Preferably said opening has a dimension parallel to the longitudinal axis of the glass container being processed that is comprised between 3 and 10 mm.

The production steps performed in the N workstations may comprise at least one processing step selected from: cutting, piercing, and forming.

The step of forming the glass containers being processed can be selected from the group comprising: shoulder forming, mouth forming and bottom forming.

Preferably, the forming step is carried out with the aid of special tools (e.g. rollers) arranged in the respective workstation of the N workstations.

In one embodiment, the production line comprises N supports, each of the N supports being configured to support a respective glass container being processed.

Preferably, the N supports are configured to set in rotation the respective glass containers being processed around respective longitudinal axes while performing the processing steps in the N workstations, the N supports being preferably configured to set in rotation the respective glass containers being processed at a speed comprised between 350 Rpm and 900 Rpm.

Preferably, each of the N supports is configured to rotate about a respective support axis that is coincident with the longitudinal axis of the respective glass container being processed so as to transport in rotation the respective glass container about the respective longitudinal axis.

Preferably, in the case of N>1, each of the N supports is configured to move a respective glass container being processed between one station and the other of the N workstations.

Preferably, in the case of N>1, the production line comprises a structure that is rotatable around an axis of rotation parallel to the longitudinal axes of the glass containers being processed and the N supports are mounted integrally in rotation on said rotatable structure so as to transport in rotation the respective glass containers between one station and the other of the N workstations during the rotation of the rotatable structure.

Preferably, in the case of N>1, the N workstations are arranged in sequence along a closed loop trajectory, which is followed by the N supports transported in rotation by the rotatable structure.

Preferably, the rotatable structure is configured to rotate step-by-step around said axis of rotation with a time interval T between one movement step and the other, wherein the time interval T is defined by a movement time Tm and a stopping time Ts.

Preferably, the time interval T between one movement step and the other is equal to a production cycle time Tc of the glass containers in the production line.

Preferably, the time interval T between one movement step and the other is comprised between 0.8 and 2.8 seconds, preferably between 1 and 1.4 seconds.

Preferably, the stopping time Ts is comprised between 0.5 and 1.8 seconds; preferably between 0.6 and 0.8 seconds.

Preferably, the movement time Tm is comprised between 0.3 and 1 second, preferably between 0.4 and 0.6 seconds.

Preferably, the first time interval T1 and the further time interval T3 have a total duration comprised between 1.5 and 2.5 seconds.

In one embodiment, the first time interval T1, the second time interval and the further time interval T3 have a total duration comprised between 1.5 and 2.5 seconds.

The glass of the glass containers may be selected from borosilicate, barium borosilicate and lime soda.

In the production process, while performing said plurality of production steps, said glass container is preferably rotated about a respective longitudinal axis, preferably at a speed comprised between 350 Rpm to 900 Rpm.

In the production process, the plurality of production steps preferably also comprises another step of heating the portion of said glass container by delivering microwaves and conveying them to the portion of said glass container, wherein the microwave delivery is carried out at least at a determined power level Px for a determined time interval Tx so as to bring said portion of said glass container from a current temperature, greater than ambient temperature, to a second predetermined working temperature.

In the production process, the first heating step preferably comprises heating a circumferential part of the outer side surface of a tubular body of the glass container.

In the production process, the other heating step preferably comprises heating a circumferential part of the outer side surface of a tubular body of the glass container.

In the production process, in a radial section of the glass container in which the outer side surface of the tubular body delimits a circumference, the microwaves are preferably conveyed to an outer side surface part of the tubular body forming an arc of circumference having dimensions smaller than the semi-circumference.

Preferably the ratio between the dimensions of the arc of circumference and the semi-circumference is comprised between 0.3 and 1; even more preferably between 0.4 and 0.8; even more preferably between 0.5 and 0.7.

The plurality of production steps may comprise at least one processing step selected from: cutting, piercing, and forming.

In the production process, the processing step is preferably carried out after the first heating step or after the other heating step.

In the production process, the processing step is preferably carried out at the same time as the first heating step, preferably upon reaching the first predetermined working temperature.

In the production process, the processing step is preferably carried out concurrently with the other heating step, preferably upon reaching the second predetermined working temperature.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
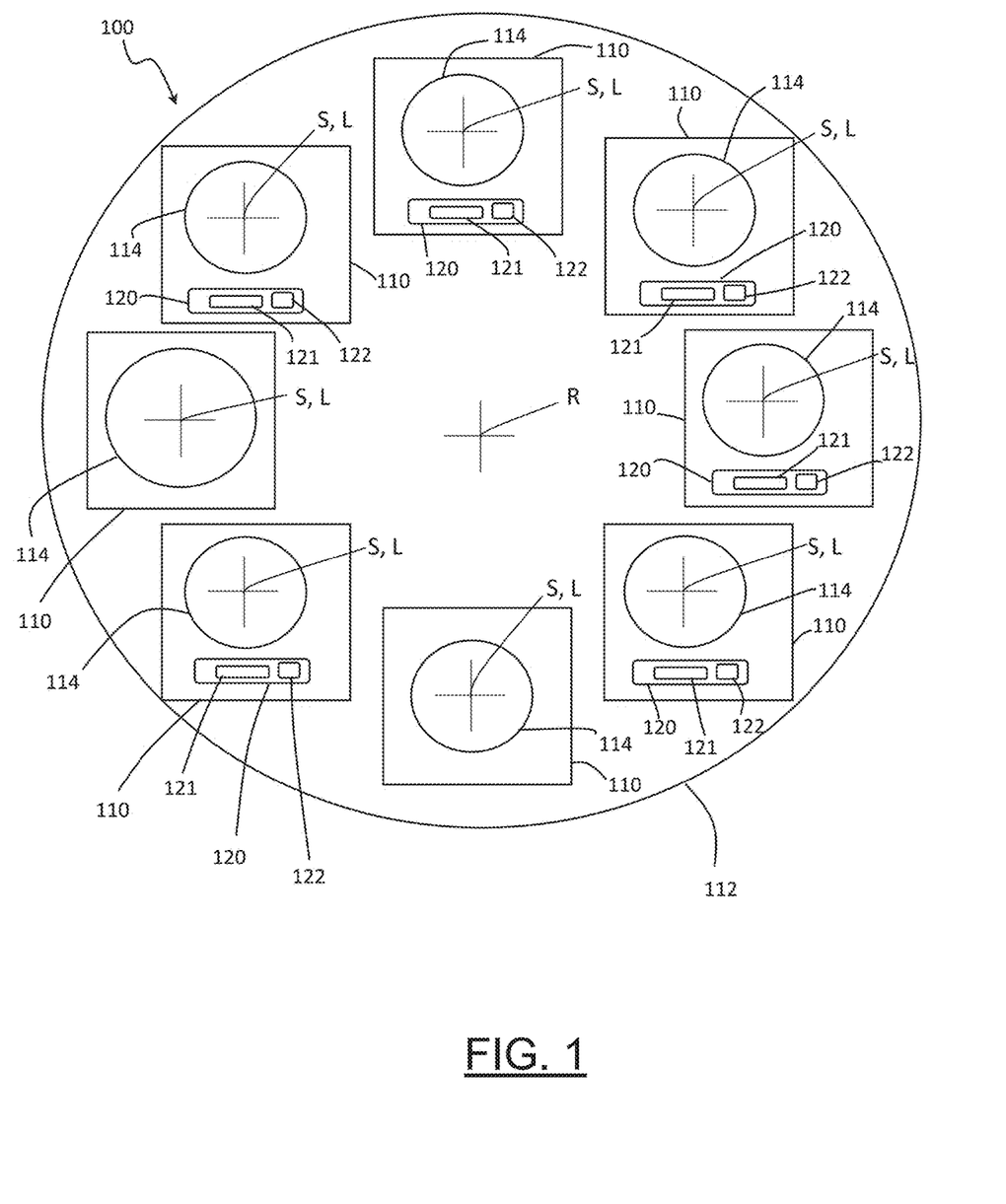
FIG. 1 schematically shows a glass container production line according to an embodiment of the present disclosure.

FIG. 1 shows a production line 100 for the production of glass containers 10 according to an embodiment of the present disclosure. The glass containers 10 may be, for example, bottles, syringes, or cartridges for pharmaceutical use.

Figure 2:
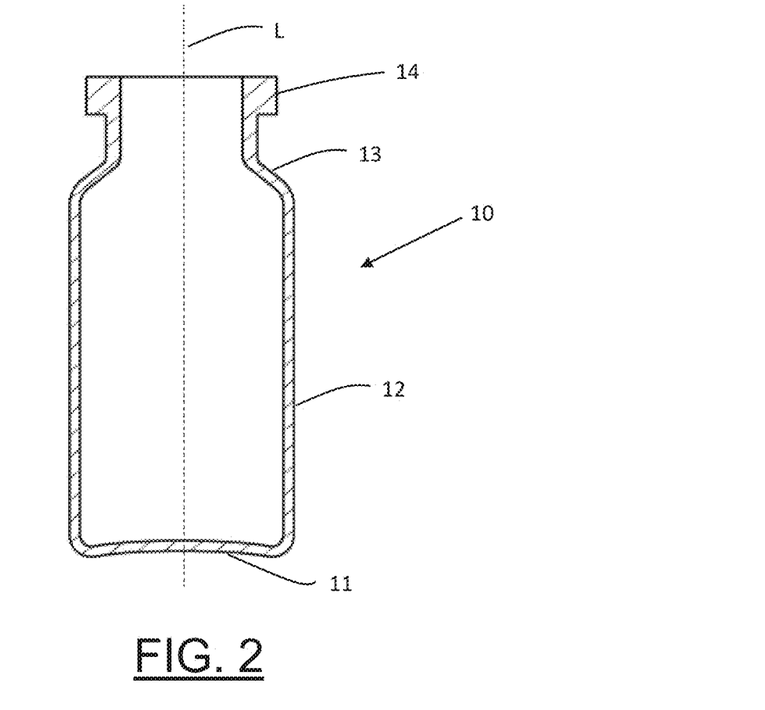
FIG. 2 shows an axial section of a glass container realizable by the production process and line according to the present disclosure.

FIG. 2 schematically shows a glass container 10 in the form of a bottle for pharmaceutical use comprising a bottom 11, a tubular body 12 having a longitudinal axis L constituting an axis of symmetry of the tubular body 12, and, at an end portion opposite the bottom 11, a shoulder 13 and a mouth 14.

The production line 100 comprises N workstations 110 to perform respective production steps on glass containers 10 being processed along the line 100, wherein N is an integer at least equal to 1. In a completely exemplifying and non-limiting way, FIG. 1 shows a situation with N=8. For example, N may be comprised between 2 and 30.

In particular, the production line 100 is configured to produce glass containers 10 starting from a raw material formed by pieces of glass tube. For example, the glass may be a borosilicate glass or barium borosilicate or lime soda. The described method can also be applied to quartz containers. The pieces of glass tube can have a predefined length, for example 1.5 metres, and have different diameters depending on the type and model of glass container 10 to be made. For example, the pieces of glass tube can have a diameter comprised between 5 and 50 mm.

The production steps performed in the N workstations 110 may comprise, for example, at least one of the following steps: a step of heating alone, a step of piercing an end of the glass container 10 being processed, a step of forming the shoulder 13 of the container 10, a step of forming the mouth 14 of the container 10, a cutting step and a step of forming the bottom 11 of the container 10. As described in more detail below, the heating-only step may be performed at one or more consecutive workstations 110 so as to bring the glass to the desired working temperature for a specific processing step.

In the illustrated embodiment, the production line 100 comprises a rotatable structure 112 configured to be set in rotation by suitable mechanisms (not illustrated) about an axis of rotation R.

In the illustrated embodiment, the production line 100 comprises N supports 114 (e.g., comprising spindles) that are configured to support respective glass containers 10 being processed at the N workstations 110. The N supports 114 are mounted integrally in rotation on said rotatable structure 112 so as to transport the respective glass containers 10 being processed between one station and the other of the N workstations 110 (which remain fixed) during the rotation of the rotatable structure 112. In the illustrated embodiment, the N workstations 110 are arranged in sequence along a closed loop trajectory (not shown), which is followed by the N supports 114 transported in rotation by the rotatable structure 112.

The rotatable structure 112 is configured to rotate step-by-step around said axis of rotation R with a time interval T between one movement step and the other, wherein the time interval T is defined by a movement time Tm and a stopping time Ts. The time interval T between one movement step and the other is equal to a production cycle time Tc of the glass containers 10 in the N workstations. For example, the production cycle time Tc is comprised between 0.8 and 2.8 seconds, preferably between 1 and 1.4 seconds. The stopping time Ts corresponds to the processing time in each of the N workstations 110. For example, said processing time is comprised between 0.5 and 1.8 seconds, preferably between 0.6 and 0.8 seconds. In turn, the movement time Tm is comprised between 0.3 and 1 second, preferably between 0.4 and 0.6 seconds.

Figure 4:
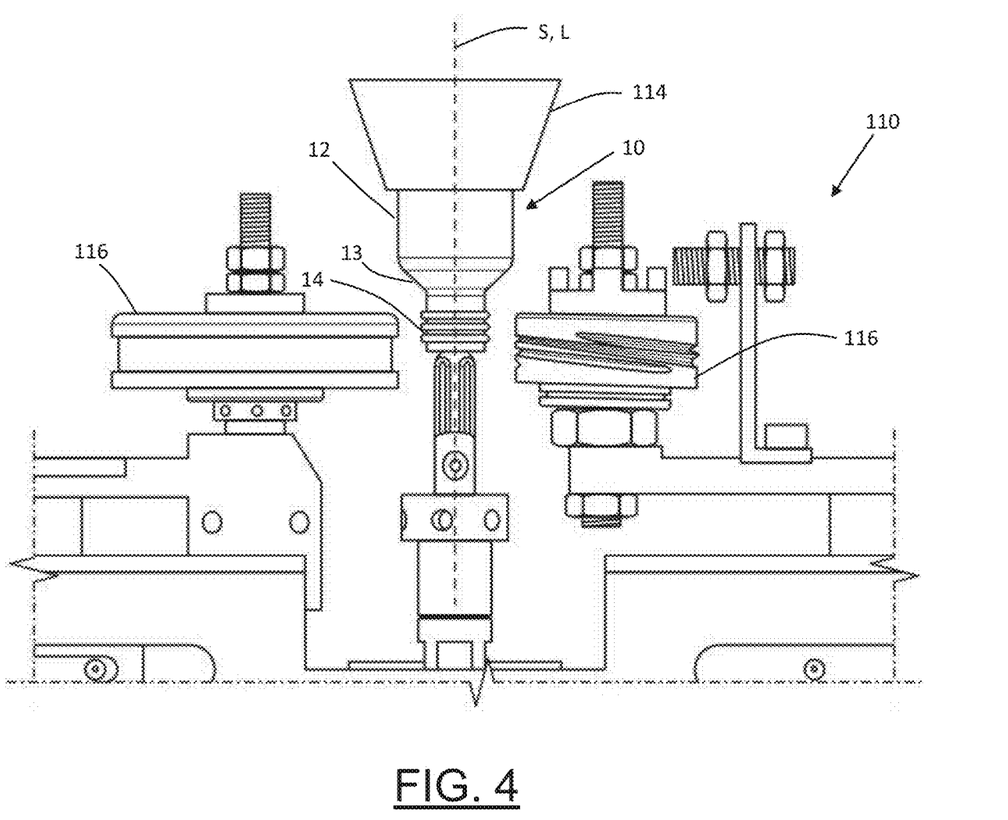
FIG. 4 schematically shows a forming step realizable by the production process and line according to the present disclosure.

Each of the N supports 114 is configured to rotate about a respective support axis S that is coincident with the longitudinal axis L of the respective glass container 10 being processed (see for example what is illustrated in FIG. 4).

The glass containers 10 being processed are mounted integrally in rotation on the respective supports 114 so as to be transported in rotation around the respective longitudinal axis L. The glass containers 10 being processed are, for example, set in rotation at a speed comprised from 350 Rpm to 900 Rpm.

In the illustrated embodiment, the rotatable structure 112, with the N supports associated with it, is configured to support the glass containers 10 being processed during the processing of one end thereof (in particular, at the mouth 14 and possibly the shoulder 13). For processing the other end (in particular, at the bottom 11) of the glass containers 10 being processed, the production line 100 preferably also comprises a further rotatable structure (not shown) having characteristics similar to the rotatable structure 112. This further structure will be positioned with respect to the rotatable structure 112 and suitably synchronized in the movements so as to synchronize the processings carried out by them according to mechanisms well known in the art which will therefore not be further described.

With reference to FIGS. 3-6, typical processing steps that can be performed in the N workstations 110 are described below. These steps are not all necessarily present for each type of glass container 10 and their exact sequence may depend on the type of container 10, type of glass and dimension of the container 10 itself. These steps can be carried out with the aid of a heating device 120 adapted to bring the glass to a desired working temperature during processing (for example during the step of cutting, forming the bottom and piercing described below) or immediately before processing (for example for the shoulder and mouth forming step described below).

Figure 3:
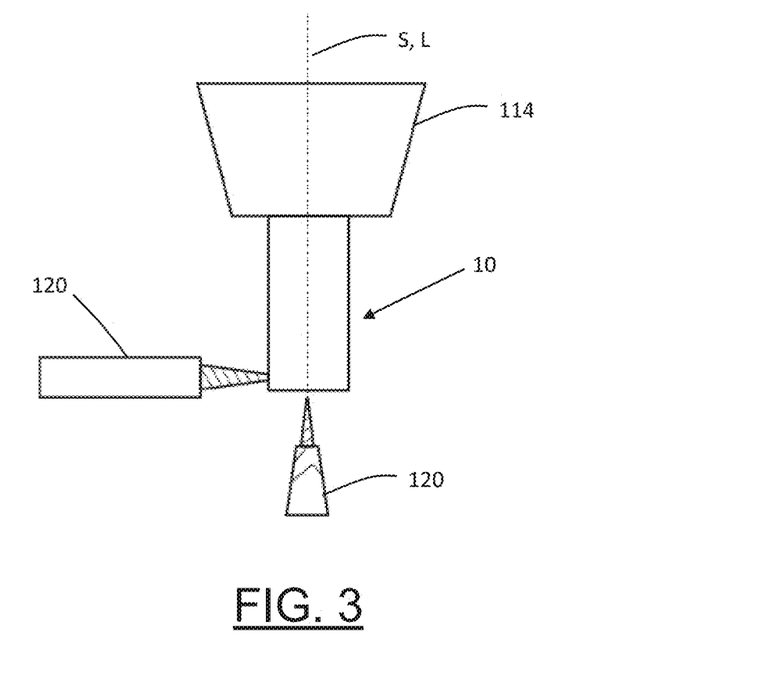
FIG. 3 schematically shows a piercing step realizable by the production process and line according to the present disclosure.

FIG. 3 schematically shows a piercing step that can be carried out to pierce an end of the piece of glass tube which, as will be clear from the description that follows on the cutting step, can be closed following a cutting operation carried out previously on a glass container 10 being processed. In this step, the closed end of the glass container 10 being processed is pierced by heating to an appropriate temperature (for example between about 1000° C. and 1200° C.) by means of a heat source of the heating device 120 directed from below and preferably positioned in axis with the glass container 10 being processed. Such a source may be aided by a further side heat source of the heating device 120. The piercing step may, for example, be followed by a step (not shown) of forming the shoulder 13 which may comprise a first sub-step of heating a lower zone of the glass container 10 being processed in one or more of the N workstations 110. This first sub-step is followed by a second sub-step of actual forming the shoulder 13 performed in another of the N workstations 110 with the aid of special rollers (not shown).

FIG. 4 shows a step of forming the mouth 14 which may, for example, be performed after the step of forming the shoulder 13 and may comprise a first sub-step of heating (not illustrated) a lower zone of the glass container 10 being processed in one or more of the N workstations 110. This first sub-step is followed by a second sub-step of actual forming of the mouth 14 carried out in another of the N workstations 110 with the aid of special rollers 116.

Figure 5:
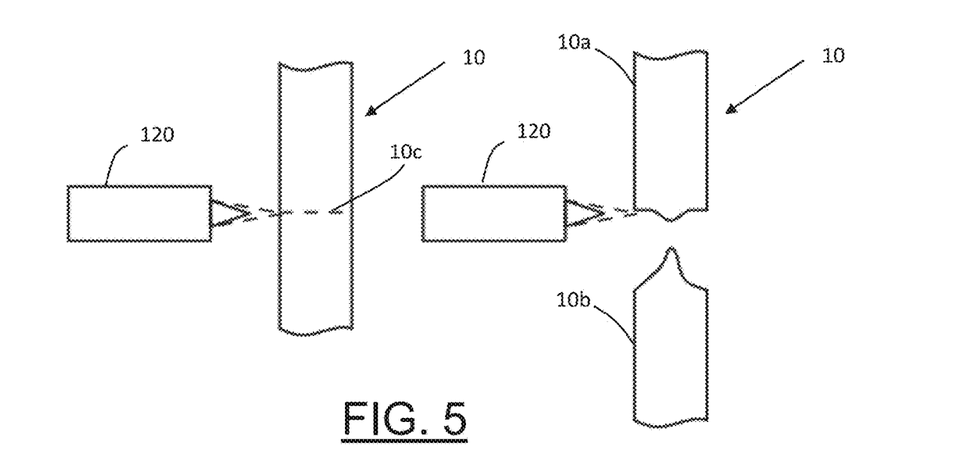
FIG. 5 schematically shows a cutting step realizable by the production process and line according to the present disclosure.
Figure 6:
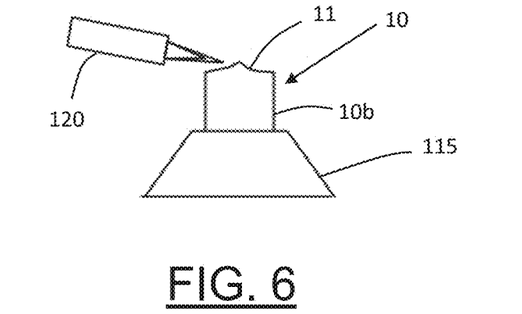
FIG. 6 schematically shows a further forming step realizable by the production process and line according to the present disclosure.

FIG. 5 shows a hot cutting step which can, for example, be performed after the steps of forming the shoulder 13 and the mouth 14. This step is carried out by heating a cutting zone 10c (at the end of the glass container 10 being processed that is on the opposite side with respect to the shoulder 13 and the mouth 14, not illustrated in FIG. 5). If necessary, in order to bring the cutting zone 10c from the ambient temperature to the predetermined working temperature (which for example can be comprised between about 1200° C. and 1400° C.), heating can be carried out in several successive workstations 110. Once the predetermined working temperature has been reached, the step ends with a "tear" or "detachment" at the cutting zone 10c of a lower portion 10b (with respect to the cutting zone 10c) of the glass container 10 being processed. In this step, due to the high temperatures reached, closing of two detached ends of the upper portion 10a and of the lower portion 10b occurs. The end of the upper portion 10a is reopened with the piercing step described above with reference to FIG. 3 while the end of the lower portion 10b constitutes the bottom 11 of the glass container 10 being processed (with shoulder 13 and mouth 14 formed in the previous steps, not visible in FIG. 6). As shown in FIG. 6, the lower portion 10b therefore continues the processing in a station of the aforementioned further rotatable structure for a step of forming the bottom 11 of the glass container 10 being processed. The resulting upper portion 10a after this detachment is instead transferred to one of the N workstations 110 to carry out the piercing step described above and thus start a new production cycle.

FIG. 6 shows a step of forming the bottom 11 in a station of the above-mentioned further rotatable structure in which the glass container 10 being processed is supported and set in rotation about its longitudinal axis L by a respective support 115. The step of forming the bottom 11 is carried out by heating the bottom 11 to suitable temperatures (for example between about 900° C. and 1200° C.) by means of the heating device 120 and by using suitable tools (not shown) in one or more workstations. Thanks to the heating, the use of the tools and the centrifugal force due to the rotation, the glass material is distributed in the bottom 11 according to a desired profile. After the bottom 11 forming step, an air cooling step is generally provided in one of the stations of the further rotatable structure mentioned above.

It can be observed that the steps described above are typically performed for the formation of a glass container 10 of the type described with reference to FIG. 2. In the case of other types of containers (as in the case, for example, of syringes or cartridges), some of the steps described above may be omitted and other steps added. For example, in the case of cartridges and syringes (which are open at both ends and therefore bottomless), there is a step of forming the cone and flange (for syringes) and a step of forming the mouth (for cartridges). In the case of "staked needle" type syringes the cone is closed after forming, and must be reopened by subsequent piercing in a manner known in the art. In addition, a cold cutting step (using traditional thermal shock) is envisaged for both. In the case of cartridges, the cold cutting step is followed by a re-burning step adapted to bevel the profile of the contour of the cut opening by slightly softening the glass obtained by heating to a predetermined temperature (for example of about 1300° C.). This re-burning operation enables to make the cut end less sharp and reduce the risk that glass particles remain not adhered and subsequently diffuse into the liquid inserted into the glass container 10 produced.

According to the present disclosure, the production line 100 also comprises M heating devices 120 associated with at least a part of the N workstations 110, adapted to heat portions of the glass containers 10 being processed for performing the various processing steps. With M it is indicated an integer at least equal to 1. In a completely exemplifying and non-limiting way, FIG. 1 shows a situation with M=6. M is generally less than N. For example, the heating devices 120 can be omitted in the workstations 110 (such as the one schematically illustrated in FIG. 4) intended for the sub-step of forming the shoulder 13 and the mouth 14 by means of rollers (the heating of the portion of glass of interest being carried out in one or more of the previous workstations 110 in which a pure heating sub-step is performed so as to bring the glass to the desired working temperature for the forming sub-step).

According to the present disclosure, the M heating devices 120 comprise, as the only type of heating source, M microwave sources 121. The M heating devices 120 further comprise M adjustment units 122 operatively associated with the M microwave sources 121. The M microwave sources 121 are preferably configured to emit microwaves in the range of 2 to 5 GHZ, preferably at 2.45 GHz. The M microwave sources 121 are preferably microwave generators of the solid-state type. The M adjustment units 122 are preferably configured to adjust the power of the respective microwave sources 121 (i.e. to switch from one power level to another) with an adjustment time of less than 100 ms, for example with an adjustment time within a range of 10 to 20 ms. The M microwave sources 121 are preferably configured to emit pulses with a variable duty cycle.

Each of the M adjustment units 122 is preferably configured to adjust the power of the respective microwave source 121 by adjusting the duty cycle of the pulses. This advantageously allows to obtain very fast switching times from one power level to another (less than 100 ms, for example comprised between 10 and 20 ms). For example, it can be envisaged to emit a single pulse (100% duty cycle) for each power level or to emit for each power level a train of pulses having a different duty cycle for each power level.

Preferably, in each of the workstations 110 to which one of the M heating devices 120 is associated, the adjustment unit 122 is configured to adjust the respective microwave source 121 so as to switch it off at the exit of the glass container 10 being processed and to switch it on again at the entrance of the next glass container 10 being processed.

Preferably, each of the M adjustment units 122 is configured to switch the respective microwave source 121 off and on with a switch-on/switch-off time of less than 100 ms, preferably with a switch-on/switch-off time within a range of 10 to 20 ms.

Thanks to the very low switch-on/switch-off times compatible with the high-speed process of the present disclosure, reducing energy consumption is made possible by switching off the microwave sources 121 during the movement time Tm of the glass containers 10 being processed from one workstation 100 to another.

Figure 7:
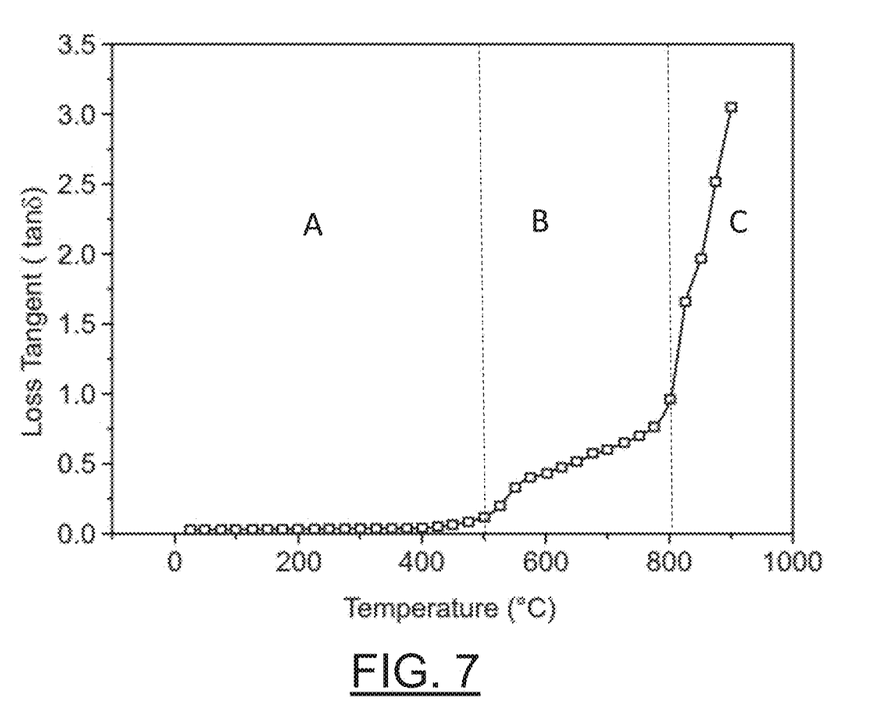
FIG. 7 shows a curve representing the trend of the loss tangent (tan) as the temperature for a barium borosilicate glass varies.

The Applicant has further observed that while solid glass has an almost zero microwave absorption factor at low temperatures (e.g. less than 400° C.), it begins to grow towards a certain temperature (e.g. around 500° C.) and then has a sharp increase above a critical temperature (e.g. around 800° C.). This behaviour is illustrated in FIG. 7, which by way of example shows a curve representing the trend of the absorption factor expressed as a loss tangent (or tan □) as the temperature for a barium borosilicate glass (BBS) varies. As can be noted, at low temperatures, the tan □ value is almost zero; it begins to grow at a temperature of about 525° C. which corresponds to the glass transition temperature of borosilicate glass and then it has a sharp increase above about 825° C. which corresponds to the softening point of borosilicate glass.

In essence, three zones can be identified in this curve: a first zone A with almost zero slope in which the tan □ value is almost zero in a temperature interval comprised between 0 and about 525° C. that corresponds to the glass transition temperature of borosilicate glass; a final zone C with maximum slope above about 825° C. (which corresponds to the softening point of borosilicate glass) in which the tan □ value increases rapidly as the temperature increases; and a central zone B in which the slope of the curve is intermediate between that of the first zone A and the final zone C, in a temperature interval comprised between about 525° C. and about 825° C., that is between the glass transition temperature and the temperature of the softening point of borosilicate glass.

The Applicant has observed that in a high-speed production line 100 as that of the present disclosure it is necessary, on the one hand, for each production step, to quickly reach a respective predetermined working temperature for the glass being processed, on the other hand it is necessary to have a localized and precisely controllable heat source.

The Applicant has also observed that in the various workstations 110 the portions of the glass containers to be heated may be at ambient temperature (such as for example in the case of the cutting zone 10c to be heated in the cutting step) or at higher temperatures due to the heating undergone in an immediately previous production step (such as for example in the case of the portions to be heated in the steps of piercing and forming the shoulder 13, mouth 14 and bottom 11 described above).

In the first case, it will be necessary to carry out a first heating step so as to bring the portion of the glass container 10 being processed from the ambient temperature to a first predetermined working temperature. In the second case, it will be necessary to carry out another heating step so as to bring the portion of the glass container 10 being processed from a current temperature (which will be higher than the ambient temperature) to a second predetermined working temperature. The first and second predetermined working temperatures may be the same or different depending on the optimum working temperature required for the specific processing step.

Both the first heating step and the other heating step may be carried out in a single workstation 110 or in more consecutive workstations 110 depending on whether the required heating times are longer or shorter than the stopping time Ts envisaged in each workstation 110.

The adjustment unit(s) 122 of the heating device(s) 120 present in the workstation(s) 110 intended to perform said other heating step is/are configured to adjust the respective microwave source(s) 121 so as to deliver microwaves at least at a determined power level Px for a determined time interval Tx so as to bring the involved portion of the glass container 10 being processed from the current temperature to the second predetermined working temperature.

Said at least one power level Px and the time interval Tx are preferably selected as a function of the positions of the current temperature and of the second predetermined working temperature in a curve, of the type shown in FIG. 7, which defines the tan □ trend as a function of the temperature.

At the exit of each glass container 10 being processed from the workstation 110, the respective microwave source 121 is preferably switched off and then switched on again upon arrival of the next glass container 10.

The adjustment unit(s) 122 of the heating device(s) 120 present in the workstation(s) 110 intended to perform the first heating step is/are configured to adjust the respective microwave source(s) 121 so as to deliver microwaves while performing the first heating step:
at a first respective power level P1 for a first time interval T1 so as to bring said portion of said glass container from an ambient temperature to an intermediate temperature, and
at a further respective power level P3, which is lower than the first power level P1, for a further time interval T3 following the first time interval T1, so as to bring said portion of said glass container from said intermediate temperature to the first predetermined working temperature.

In the event that the first heating step is performed by a single workstation 110, the adjustment unit 122 of the heating device 120 of said single workstation 110 is preferably configured to adjust the respective microwave source 121 so as to switch from the first power level P1 to the further power level P3 with a switching time of less than 100 ms, preferably within a range of 10 to 20 ms.

The heating devices 120 of the present disclosure, using microwave sources 121 adjustable in power, advantageously allow to modulate the power supplied, delivering a high first power level P1 for a first time interval T1, where the tan □ value is very low, so as to intensively heat the solid glass and bring it quickly into a more fluid phase where the absorption efficiency increases quickly. At that point, it is envisaged to proceed for a further time interval T3 until the predetermined working temperature for the processing step in question is reached (for example equal to 1200° C.) with a much lower power delivery P3 that allows to control with precision the heating of the glass (avoiding melting or overheating) in zone C above the softening point where tan □ grows very quickly as the temperature increases.

For example, the first time interval T1 may correspond to the time required to bring the glass from the ambient temperature to a temperature comprised between the glass transition temperature and the softening point of the glass with a microwave irradiation at the first power level P1. In the case of the curve in FIG. 7, the first time interval T1 could correspond to the time required to bring the glass to a temperature of about 600° C.

The values of T1, T3, P1 and P3 generally depend on the type of material used and the dimensions of the glass container 10 being processed. For example, for the production of a 2 ml bottle (2R) from a 16 mm-diameter piece of borosilicate glass tube, the first power level P1 may be equal to 700-750 W while the further power level P3 may be equal to 300 W. Further, the total time required (equal to T1+T3) to bring the glass to the first predetermined working temperature may be, for example, of about 2 seconds.

In any case, at the exit of each glass container 10 being processed from the workstation 110, the respective microwave source 121 is preferably switched off and then switched on again upon arrival of the next glass container 10.

In a preferred embodiment, the adjustment unit(s) 122 of the heating device(s) 120 present in the workstation(s) 110 intended to perform the first heating step is/are configured to adjust the respective microwave source(s) 121 so as to deliver microwaves while performing the first heating step at a second power level P2 for a second time interval T2. The second power level P2 is comprised between the first power level P1 and the further power level P3 and the second time interval T2 is temporally comprised between the first time interval T1 and the further time interval T3.

In the event that the first heating step is performed by a single workstation 110, the adjustment unit 122 of the heating device 120 of said single workstation 110 is preferably configured to adjust the respective microwave source 121 so as to switch from the first power level P1 to the second power level P2 and from the second power level P2 to the further power level P3 with a switching time of less than 100 ms.

In this preferred embodiment, the heating devices 120 advantageously allow the power supplied to be modulated, delivering a high first power level P1 for a first time interval T1, in zone A where the tan value □ is almost zero (with an almost zero curve slope), so as to intensively heat the solid glass and quickly bring it to zone B where tan □ begins to grow with an intermediate curve slope. At that point, it is envisaged to proceed by delivering a second intermediate power level P2 for a second time interval T2 until the softening point is reached where tan □ grows very rapidly with a very high curve slope (zone C). Then it is envisaged to proceed for a further time interval T3 until a predetermined working temperature is reached for the processing step in question (for example equal to 1200° C.) with a much lower power delivery P3 that allows to control with precision the heating of the glass (avoiding melting or overheating) in zone C above the softening point where tan grows very quickly as the temperature increases.

For example, in this preferred embodiment, the first time interval T1 may correspond to the time required to bring the glass from the ambient temperature to the glass transition temperature; the second time interval T2 may correspond to the time required to bring the glass from the glass transition temperature to the softening point; and the further time interval T3 may correspond to the time required to bring the glass from the softening point to the predetermined working temperature (e.g. equal to 1200° C.).

In the case of the curve of FIG. 7, in this preferred embodiment, the first time interval T1 could correspond to the time required to bring the glass from an ambient temperature to a temperature of about 500° C. while the second time interval T2 could correspond to the time required to bring the glass from a temperature of about 500° C. to a temperature of about 800° C.

Also, in this case the values of T1, T2, T3, P1, P2 and P3 generally depend on the type of material used and the dimensions of the glass container 10 being processed. For example, for the production of a 2 ml bottle (2R) from a 16 mm-diameter piece of borosilicate glass tube, the first power level P1 may be equal to 700-750 W; the second power level P2 may be equal to 400 W while the further power level P3 may be equal to 250 W. In addition, the total time required (equal to T1+T2+T3) to bring the glass to the desired working temperature may be, for example, of about 2 seconds.

In any case, at the exit of each glass container 10 being processed from the workstation 110, the respective microwave source 121 is preferably switched off and then switched on again upon arrival of the next glass container 10.

Although not illustrated, it is possible to use, in association with one or more of the heating devices 120, a pyrometer or other non-contact temperature meter configured to control in real time the temperature reached by the heated glass and adjust accordingly the power of the microwave source 121 so as to obtain the desired power level (for example, P1, P2, P3 or Px) by means of an appropriate feedback control.

In a preferred embodiment of the present disclosure, the M heating devices 120 also comprise waveguides 123 associated with the M microwave sources 121. These waveguides 123 are configured to convey the delivered microwaves towards a portion of the glass container 10 being processed. For example, the waveguides 123 are configured to convey the microwaves in a substantially rectangular band that has a height between 3 and 10 mm and is such as to embrace at most the diameter of the tubular body 12 which can be comprised between 5 and 50 mm. Taking advantage of the fact that the glass container 10 being processed is rotating, the waveguides 123 are preferably configured to convey the microwaves in a rectangular band narrower than the diameter of the tubular body 12 of the glass container 10 being processed so as to maximize irradiation uniformity. In particular, each waveguide 123 has an opening 124 that delimits an area of exit of the microwaves from the waveguide 123 that has a width (i.e., a dimension perpendicular to the longitudinal axis L of the glass container 10 being processed) that is less than or equal to the diameter of the tubular body 12 of the glass container 10 being processed.

Figure 8:
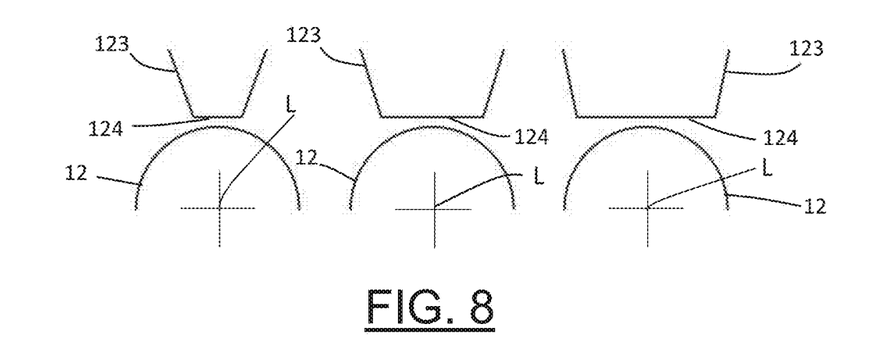
FIG. 8 schematically shows in radial section a semi-circumference of a glass container being processed associated with waveguides having openings of different dimensions.

In fact, as schematically shown in FIG. 8, a rectangle embracing the entire diameter of the tubular body 12 will inevitably have an air gap between the opening 124 of the waveguide 123 and the outer surface of the tubular body 12 that is larger at the ends, thereby the energy is dispersed more at that point. In the radial half-section of the tubular body 12 shown in FIG. 8, in which the outer side surface of the tubular body 12 delimits a semi-circumference, the microwaves are therefore preferably conveyed over an arc of circumference having dimensions smaller than the semi-circumference.

Preferably, the ratio between said dimension of the waveguide opening and the diameter of the glass container being processed is comprised between 0.3 and 1; even more preferably between 0.4 and 0.8; even more preferably between 0.5 and 0.7. For the diameters commonly used for the production of glass containers for pharmaceutical use, this can correspond to a dimension comprised between 10 and 40 mm. Alternatively, a waveguide 123 may be provided with a curved mouth (not shown), but it adapts less to changes in diameter of the piece of glass tube being processed in the production line 100.

From the foregoing description it will be clear that the present disclosure in its various aspects allows, for each production step, both to quickly reach an optimal working temperature for the glass being processed and to have a localized and precisely controllable heat source. This is guaranteed, in particular, thanks to the modulation of the power delivered according to power levels P1, P2, P3 and time intervals T1, T2, T3 appropriately defined and, in the case of heating step carried out in a single workstation, thanks to fast switching times (less than 100 ms) from one power level to another. Furthermore, thanks to the combined action of the rotation of the glass container 10 being processed at high speed (from 350 to 900 rpm) and the optimization of the characteristics of the waveguide 123, it is possible to obtain an effective and uniform irradiation at 360° over the entire circumference of the glass container 10 being processed. Moreover, thanks to very fast switch-on/switch-off times compatible with a high-speed production process, it is possible to reduce energy consumption by switching off the microwave sources during the movement of the glass containers being processed from one workstation to another.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A glass container production line comprising:
   N workstations configured to perform respective production steps on glass containers being processed along the line, wherein N is an integer at least equal to 1;
   M heating devices associated with at least a part of the N workstations to heat portions of the glass containers being processed, wherein M is an integer at least equal to 1;
   wherein the M heating devices respectively comprise M microwave sources and M adjustment units operatively associated with the M microwave sources, each of the M adjustment units being configured to adjust in power the respective microwave source;
   wherein one or more workstations of the N workstations is intended to perform a first heating step to bring a portion of each glass container being processed from an ambient temperature to a predetermined first working temperature, the adjustment units of the heating devices of said one or more workstations being configured to adjust the respective microwave sources so as to deliver microwaves while performing the first heating step:
   at a first power level P1 for a first time interval T1 so as to bring said portion of said glass container from the ambient temperature to an intermediate temperature, and
   at a further power level P3, which is lower than the first power level P1, for a further time interval T3 following the first time interval T1, so as to bring said portion of said glass container from said intermediate temperature to the first predetermined working temperature.

2. The production line according to claim 1, wherein the adjustment units of the heating devices of said one or more workstations intended to perform the first heating step are configured to adjust the respective microwave sources while performing the first heating step at a second power level P2 for a second time interval T2; wherein the second power level P2 is comprised between the first power level P1 and the further power level P3 and the second time interval T2 is temporally comprised between the first time interval T1 and the further time interval T3.

3. The production line according to claim 1, wherein, in the case of a single workstation intended to perform the first heating step, the adjustment unit of the heating device of said single workstation is configured to adjust the respective microwave source so as to:
   switch from the first power level P1 to the further power level P3 with a switching time lower than 100 ms, preferably within a range of 10 to 20 ms; or, when the second power level P2 is also present, so as to:
   switch from the first power level P1 to the second power level P2 and from the second power level P2 to the further power level P3 with a switching time lower than 100 ms, preferably within a range of 10 to 20 ms.

4. The production line according to claim 1, wherein each of the M adjustment units is configured to adjust the respective microwave source so as to switch it off at the exit of one of the glass containers being processed from the respective workstation and switch it on again at the entrance of the next glass container being processed.

5. The production line according to claim 1, wherein said one or more workstations of the N workstations is intended to perform another step of heating the portion of each glass container being processed, the adjustment units of the heating devices of said one or more workstations being configured to adjust the respective microwave sources so as to deliver microwaves while performing said another heating step at least at a determined power level Px for a determined time interval Tx so as to bring said portion of said glass container being processed from a current temperature greater than ambient temperature, to a second predetermined working temperature, wherein said second predetermined working temperature is equal to or different from the first predetermined working temperature.

6. The production line according to claim 5, wherein said current temperature is comprised:
   between a glass transition temperature of the glass of the glass containers being processed and said second predetermined working temperature; or
   between a softening temperature of the glass of the glass containers being processed and said second predetermined working temperature.

7. The production line according to claim 1, wherein the N workstations are configured to perform the respective production steps with:
   a production cycle time Tc comprised between 0.8 and 2.8 seconds, preferably comprised between 1 and 1.4 seconds;
   a stopping time Ts of each glass container being processed at each of the N workstations comprised between 0.5 and 1.8 seconds; preferably comprised between 0.6 and 0.8 seconds; and
   a movement time Tm of each glass container being processed between one station and the other of the N workstations comprised between 0.3 and 1 second, preferably comprised between 0.4 and 0.6 seconds.

8. The production line according to claim 1, wherein the M heating devices comprise the M microwave sources as the only type of heating source.

9. The production line according to claim 1, wherein the first power level P1 is at least 1.5 times the further power level P3; preferably it is at least 1.8 times the further power level P3; more preferably it is at least 2 times the further power level P3; even more preferably it is at least 2.5 times the further power level P3.

10. The production line according to claim 1, wherein said intermediate temperature to which the glass is brought at the end of the first time interval T1 is comprised between a glass transition temperature and a softening temperature of the glass of the glass containers being processed.

11. The production line according to claim 2, wherein:
the second time interval T2 corresponds to the time required, by delivering microwaves at the second power level P2, to bring the glass from said intermediate temperature reached at the end of the first time interval T1 to a second temperature comprised between said intermediate temperature and said first predetermined working temperature; and
the further time interval T3 corresponds to the time required to bring the glass from the second temperature reached at the end of the second time T2 to the first predetermined working temperature.

12. The production line according to claim 1, wherein the M microwave sources are microwave generators of the solid-state type.

13. The production line according to claim 1, wherein in the M heating devices each of the M microwave sources is associated with a waveguide configured to convey the delivered microwaves towards the portion to be heated of the glass container being processed, wherein said waveguide has an opening defining a processing area of the glass container being processed.

14. The production line according to claim 13, wherein said opening has:
a dimension perpendicular to a longitudinal axis of the glass container being processed that is lower than or equal to the diameter of a tubular body of the glass container being processed; preferably the ratio between said dimension of the waveguide opening and said diameter is comprised between 0.3 and 1; more preferably comprised between 0.4 and 0.8; even more preferably comprised between 0.5 and 0.7; and
a dimension parallel to the longitudinal axis of the glass container being processed that is comprised between 3 and 10 mm.

15. The production line according to claim 1, wherein:
the first time interval and the further time interval T3 and, when present, the second time interval T2 have a total duration comprised between 1.5 and 2.5 seconds.

16. A glass container production process comprising a plurality of production steps, said plurality of production steps comprising a first heating step of a portion of said glass container by delivering microwaves and conveying them to the portion of said glass container, wherein the microwave delivery is carried out:
at a first power level P1 for a first time interval T1 so as to bring said portion of said glass container from an ambient temperature to an intermediate temperature, and
at a further power level P3, which is lower than the first power level P1, for a further time interval T3 following the first time interval T1, so as to bring said portion of said glass container from said intermediate temperature to a first predetermined working temperature.

17. The production process according to claim 16 wherein, while performing said plurality of production steps, said glass container is rotated about a respective longitudinal axis, preferably at a speed comprised between 350 rpm and 900 rpm.

* * * * *